US011455148B2

(12) United States Patent
Trim et al.

(10) Patent No.: US 11,455,148 B2
(45) Date of Patent: Sep. 27, 2022

(54) SOFTWARE PROGRAMMING ASSISTANT

(71) Applicant: International Business Machines Corporation, Armonk, NY (US)

(72) Inventors: Craig M. Trim, Ventura, CA (US); Shikhar Kwatra, Raleigh, NC (US); Indervir Singh Banipal, Austin, TX (US); Gray Franklin Cannon, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 16/927,196

(22) Filed: Jul. 13, 2020

(65) Prior Publication Data

US 2022/0012018 A1 Jan. 13, 2022

(51) Int. Cl.
| | |
|---|---|
| *G06F 8/30* | (2018.01) |
| *G06F 8/73* | (2018.01) |
| *G06F 40/40* | (2020.01) |
| *G06N 20/00* | (2019.01) |
| *G06N 5/04* | (2006.01) |
| *G06Q 10/06* | (2012.01) |

(52) U.S. Cl.
CPC ............ *G06F 8/31* (2013.01); *G06F 8/73* (2013.01); *G06F 40/40* (2020.01); *G06N 5/04* (2013.01); *G06N 20/00* (2019.01); *G06Q 10/06398* (2013.01)

(58) Field of Classification Search
None
See application file for complete search history.

(56) References Cited

U.S. PATENT DOCUMENTS

| | | | | |
|---|---|---|---|---|
| 5,557,776 | A  * | 9/1996  | Brown  | G06F 8/47 717/146 |
| 8,490,050 | B2 | 7/2013 | Crider | |
| 9,971,577 | B2 * | 5/2018 | Sheng | G06F 8/42 |
| 10,269,345 | B2 | 4/2019 | Castillo Sanchez | |
| 10,922,357 | B1 * | 2/2021 | Chennuru | G06F 16/2457 |
| 2007/0016541 | A1 | 1/2007 | Baum | |
| 2014/0365994 | A1 * | 12/2014 | Vann | G06F 8/30 717/106 |
| 2015/0154012 | A1 * | 6/2015 | Wolfram | G06F 40/174 717/176 |
| 2015/0242396 | A1 * | 8/2015 | Su | G06F 8/42 704/2 |

(Continued)

FOREIGN PATENT DOCUMENTS

| | | |
|---|---|---|
| JP | 2006515073 A | 5/2006 |
| JP | 2017518856 A | 7/2017 |
| WO | 2006062815 A2 | 6/2006 |

OTHER PUBLICATIONS

Desai et al, "Program Synthesis using Natural Language," IEEE, 2016, 12pg. (Year: 2016).*

(Continued)

*Primary Examiner* — Ryan D. Coyer
(74) *Attorney, Agent, or Firm* — Brian D. Welle

(57) ABSTRACT

A natural language command from an operator is received. The command regards a task that a software system is to execute. A programming language in which to program the task is determined by analyzing a plurality of factors regarding the task and the software system. Code is output in the programming language that executes the task.

17 Claims, 3 Drawing Sheets

(56) References Cited

U.S. PATENT DOCUMENTS

2017/0039188 A1\* 2/2017 Allen .................. G06F 8/73
2018/0275957 A1\* 9/2018 Chavali ................ G06F 16/635

OTHER PUBLICATIONS

Good et al., "Programming language, natural language? Supporting the diverse computational activities of novice programmers," Elsevier, 2015, 15pg. (Year: 2015).\*

Parekh et al., "Pseudocode to Source Code Translation," JETIR, 2016, 6pg. (Year: 2016).\*

"Bayou," Rice University, Department of Computer Science, web archive captured Dec. 14, 2019, 2 pages. <https://web.archive.org/web/20191214184746/https://info.askbayou.com/>.

"Information extraction," Wikipedia, accessed Jun. 8, 2020, 5 pages. <https://en.wikipedia.org/wiki/Information_extraction>.

Crosson, "Extract Subject Matter of Documents Using NLP," Medium.com, Jun. 8, 2016, 4 pages. <medium.com/@acrosson/extract-subject-matter-of-documents-using-nlp-e284c1c61824>.

Murali et al., "Neural Sketch Learning for Conditional Program Generation," Cornell University, Mar. 16, 2017, 2 pages. <https://arxiv.org/abs/1703.05698>.

Rzeppa et al., "Natural Language Programming," GeeksforGeeks, Mar. 24, 2019, 13 pages. <https://www.geeksforgeeks.org/natural-language-programming/>.

Thorn, "Programming Languages for Mobile Code," ACM Computing Survey, vol. 29, No. 3, Sep. 1997, pp. 213-239. <https://doi.org/10.1145/262009.262010>.

\* cited by examiner

SOFTWARE PROGRAMMING ASSISTANT

BACKGROUND

Depending upon what one uses as criteria, there are between a few hundred and a few thousand programming languages that can be used to program computer functionality. Each of these programming languages may have different capabilities (and therein different strengths and weaknesses born from these capabilities). In modern software solutions, it is typical to use two or more programming languages within a single system to take advantage of these various strengths and to mitigate these various weaknesses. For example, a first programming language may be used to execute one functionality of the software system (due to that programming language being strong at that functionality), whereas a second programming language is used to execute a second functionality (due to that second programming language being relatively stronger at that second functionality than the first programming language).

SUMMARY

Aspects of the present disclosure relate to a method, system, and computer program product relating to converting natural language commands into software code. For example, the method includes receiving a natural language command from an operator. The command regards a task that a software system is to execute. The method also includes determining a programming language in which to program the task by analyzing a plurality of factors. The factors regard the task and the software system. The method also includes outputting code in the programming language that executes the task. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
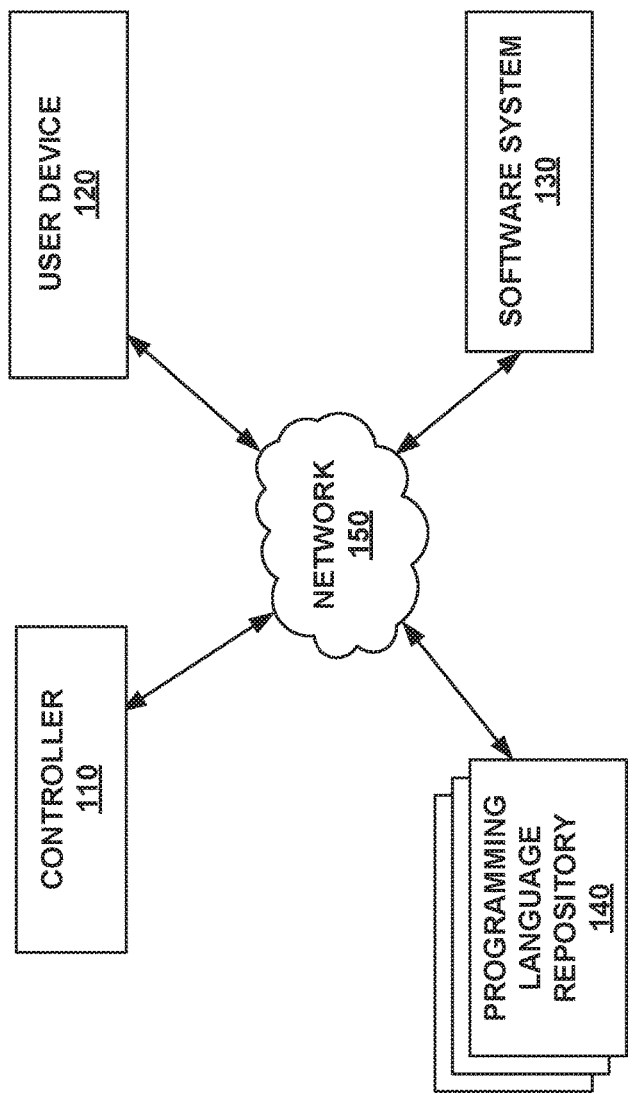
FIG. 1 depicts a conceptual diagram of an example system in which a controller may convert natural language commands from a user into software code in one or more programming languages for a software system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to converting natural language commands from an operator into programming code, while more particular aspects of the present disclosure relate to analyzing the intent of natural language commands to generate code that satisfies this command in one or more of a plurality of programming languages. While the present disclosure is not necessarily limited to such applications, various aspects of the disclosure may be appreciated through a discussion of various examples using this context.

As the performance of modern computing solutions continues to improve, so do the expectations of end users. Modern computer systems utilize a great variety of programming languages in a great variety of ways, where these computer systems that utilize programming code (these systems referred to as software systems herein) may include software applications, operating systems, firmware, or the like. Dozens of programming languages may be capable of successfully accomplishing any given task, with each of these programming languages having different strengths and weaknesses.

For example, some programming languages may have built-in tools that are unavailable (or available but not as robust) in other programming languages, such as the ability to multithread workloads (e.g., such that the programming language allows two or more threads to be simultaneously executed to maximize processing utilization) and/or perform statistical operations. Further, some programming languages may be more user friendly to manage and/or update once in production, for example based on an innate complexity of the syntax of the programming language or based on how widespread competency/mastery of the programming language is (e.g., such that the easier it is to find a person who is competent with that programming language, the easier it may be to maintain support for code that uses that programming language). For yet another example, some programming languages may be able to execute certain tasks faster and/or in a less resource-intensive manner. One of ordinary skill in the art will understand these to be but a few of the type of strengths and weaknesses that various programming languages have.

As such, modern software solutions typically employ a plurality of these programming languages to try to capture the various strengths of each of these programming languages. For example, rather than use a single programming language for the entirety of a software solution, the software solution may switch back and forth between different programming languages depending upon the tasks that the software solution is doing at different points in the code. Creating software solutions with a plurality of different programming languages may substantially increase the performance of these software solutions.

That said, utilizing different programming languages may create a lot of strain on the programmers that are creating and maintaining this code. Though most programming languages have some overlap with other programming languages, most programming languages include nuances that take years of usage for programmers to gain mastery of. As such, the act of improving software solution performance by utilizing a plurality of programming languages may increase the possibility of error in the programming process, as it may require that software developers program in languages in which these software developers are less comfortable in (e.g., such that a software developer that has mastery of multiple programming languages may need to use a programming language which that software developer has not yet fully mastered).

Some conventional solutions look to help these issues by automating some of the programming process. For example, conventional programming assistants may enable a user to generate code by converting a specific command that references a specific programming language and one or more specific tasks into corresponding syntax. Using such a conventional programming assistant, a user may provide a command that recites something like "execute the mean_average_calculation function for the values of the columns of files that come in from [application programming interface] API 123 in programming language ABC, and then send the mean averages to module XYZ for presentation." In response to such a command, the conventional programming assistant may create the lines of code (e.g., all of the syntax) that is necessary to execute this specific task (executing the mean_average_calculation function) and output the data to the specific location (presentation module XYZ) for the specific data (files coming from API 123) in that specific programming language (programming language ABC).

However, these conventional programming assistants may ignore whether or not the specific elements of the command account for factors that impact the performance and maintainability of the programming language and/or eventual software solution. Put differently, conventional solutions may only "dumbly" create code for what is requested, and not examine whether what was requested is itself logical, efficient, and/or optimized. For example, programming language ABC may have certain tools that are better suited to fulfill the intent of the command than the specified function (e.g., such that the final software system that includes the code resulting from the command may be less optimized as a result of using the function identified in the command).

Alternatively, or additionally, programming language ABC itself may be a poor choice for these tasks. For example, programming language ABC may be relatively slow at executing statistical analysis, and/or the maintenance team for the software solution may be relatively unfamiliar with programming language ABC, or another such factor. As such, even though conventional programming assistants may decrease a general number of syntax bugs in the code by converting commands into syntax via identifying these one-to-one relationships (e.g., using a programming language identified within the command, utilizing one or more functions identified within the command, or the like), the eventual code generated via these conventional programming assistants may be relatively inefficient, illogical, and/or unoptimized as a result of the conventional programming assistant being unable to identify (much less account for) these factors.

Aspects of this disclosure may solve or otherwise address some or all of these problems. For example, aspects of the disclosure may be configured to receive a natural language command, identify an intent of the command, determine one or more tasks to satisfy this intent, match these tasks to one or more programming languages, and output code within these one or more programming languages that executes these one or more tasks. As used herein, a task is an operation that is executable by code. For example, tasks may align with logical loops, routines (or subroutines), single lines of code, or the like. As discussed herein, a command may include a plurality of discrete steps, and aspects of the disclosure may either use or ignore these discrete steps depending upon how well they are determined to align with the intent of the command. In some examples, aspects of the disclosure may identify an intent of the command where the natural language words (e.g., the raw input received in a natural language format) do not specifically identify or call out this intent.

Aspects of the disclosure may weigh a plurality of factors to determine which programming language to use. For example, factors may relate to the software system that the code is being developed for, and/or factors may relate to the set of tasks. A computing device that includes a processing unit executing instructions stored on a memory may provide this functionality, this computing device herein referred to as a controller. This controller may be provided by a standalone computing device as predominantly described below for purposes of clarity, though in other examples the controller may be integrated into a user device, integrated into a programming platform, or the like. By configuring the controller to identify the intent of the command, as well as by weighing factors regarding the software system and the programming languages prior to selecting a programming language and generating the code, the controller may improve an ability to create software systems that are quick, efficient, and easy to maintain as described herein.

For example, FIG. 1 depicts environment 100 in which controller 110 converts commands from user device 120 into code for software system 130. Controller 110 may analyze data regarding programming languages and/or programming techniques from one or more programming language repositories 140 in converting commands to code. Controller 110 may include a computing device, such as computing system 200 of FIG. 2 that includes a processor communicatively coupled to a memory that includes instructions that, when executed by the processor, causes controller 110 to execute one or more operations described below.

Similarly, each of user device 120, software system 130, and programming language repository 140 may include one or more computing devices. For example, user device 120 may include a computing device (similar to computing system of FIG. 2) with which an operator may input commands for controller 110, such as a laptop, desktop, tablet, smart phone, or the like. Software system 130 may include a computing device that stores code that executes the functionality being created and/or modified by an operator. Programming language repository 140 may include one or more databases that store strengths or weaknesses or the like of various programming languages. Though each of controller 110, user device 120, software system 130, and programming language repository 140 are depicted as discrete entities (e.g., such that each may comprise or be hosted on separate computing devices), in some examples some of these entities may be on a shared computing device. For example, controller 110 may be hosted on user device 120 and/or a computing device that stores both software system 130 and programming language repositories 140.

These various computing devices of environment 100 may communicate over network 150. Network 150 may include a computing network over which computing messages may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, user device 120, software system 130, and/or programming language repository 140) may receive messages and/or instructions from and/or through network 150 and forward the messages and/or instructions for storage or execution or the like to a respective memory or processor of the respective computing/processing device. Though network 150 is depicted as a single entity in FIG. 1 for purposes of illustration, in other examples network 150 may include a plurality of private and/or public networks over which controller 110 may manage connectivity as described herein.

Commands as received by controller 110 as sent from user device 120 may be in a natural language format. For example, commands may be phrases or sentences in a language in which the operator is conversant. Commands may be written commands, verbal commands, or the like. The commands may recite functionality that the operator is requesting that controller 110 generate in code for software system 130. In some examples, the command may reference specific programming languages and/or specific programming language functions. In other examples, the command as received by controller 110 may be silent as to a programming language and/or a specific function or task.

Regardless whether or not the received command specifies a programming language, a specific function, a specific task, or the like, controller 110 may use natural language processing (NLP) techniques to identify an intent of the command and generate code that matches this intent, even if this output code does not match the specific programming language, function, task, or the like. Put differently, controller 110 may determine one or more tasks and programming languages independently of any tasks and programming languages that are recited within the command. In some examples, tasks and/or programming languages that are specifically identified by an operator within the command are weighed as factors in determining an output programming language and/or an output set of tasks. In this way, if two (or more) programming languages and/or potential tasks are relatively evenly evaluated by controller 110, then controller 110 may select the programming language and/or task that was identified in the command. By evaluating the intent of the command rather than merely creating code that correlates directly to the command, aspects of the disclosure may improve the likelihood that the code is optimized in a way in which the operator that sent the code did not consider (e.g., as reflected by the fact that the output code executes a task that was not referenced by the set of natural words in the command).

For example, controller 110 may receive the command with a plurality of discrete steps such as that command specified above of "execute the mean_average_calculation function for the values of the columns for the files that come in from API 123 in programming language ABC, and then send them to module XYZ for presentation." Controller 110 may utilize NLP techniques to determine that an intent of the operator is to present mean averages of the columns of the received files to a user. Controller 110 may then analyze factors regarding various programming languages as stored in programming language repository 140, as well as analyze factors regarding software system 130. Controller 110 may determine that the majority of code as written in software system 130 is written in programming language DEF (e.g., such that programming language DEF is the predominant programming language of the software system), and further that a support staff for software system 130 is relatively more competent in programming language DEF than in programming language ABC. Controller 110 may also identify that programming language DEF has a function similar to mean_average_calculation, but that programming language DEF has a more efficient (e.g., requiring less processing power) functionality whereby statistical values of received files can by automatically displayed. Controller 110 may evaluate each of these factors and determine that the intent of the command is better satisfied by generating code via programming language DEF that does not utilize the mean_average_calculation function, but rather uses the efficient functionality of presenting automatic statistical data as described above. As such, controller 110 may provide code that satisfies an intent of a command in a way that is both more efficient than what was requested and was also not referenced in the command.

In some examples, controller 110 may present some or all of this analysis to user device 120 for an operator to consider. For example, prior to generating the output code, controller 110 may present the selected programming language, the selected task, and/or one or more factors that controller 110 used to determine the programming language and/or task. Where controller 110 has any metrics that define potential efficiencies of various options, controller 110 may further present these metrics.

For example, to continue the example above, controller 110 may present a message to the operator that says, "should I prepare code in programming language DEF using innate statistical analysis presentation of programming language DEF as 80% of the software system is coded in programming language DEF and innate statistical analysis presentation functionality of programming language DEF decreases processing usage by 15%?" The operator may confirm one or more portions of this message (e.g., confirm to use programming language DEF, and reject using innate statistical analysis presentation functionality), in response to which controller 110 outputs code that conforms with these confirmed portions. Further, controller 110 may learn from any confirmed and/or denied portion using machine learning techniques as described herein. For example, controller 110 may reinforce rules that result in favorable results from the operator, and controller 110 may weaken rules that result in unfavorable results.

In some examples, controller 110 may further generate and/or add to documentation for software system 130 using these commands. In conventional systems, documentation is often lacking to some degree, as it can be difficult to determine what each portion of the code is doing and why, particularly in the months and years that pass between code being written and then later consulted. As such, saving the intent that was the impetus for each portion of the code within documentation for the code (e.g., as saved as comments within the code itself) may dramatically improve an ability of human programmers to maintain the code after the fact.

Figure 2:
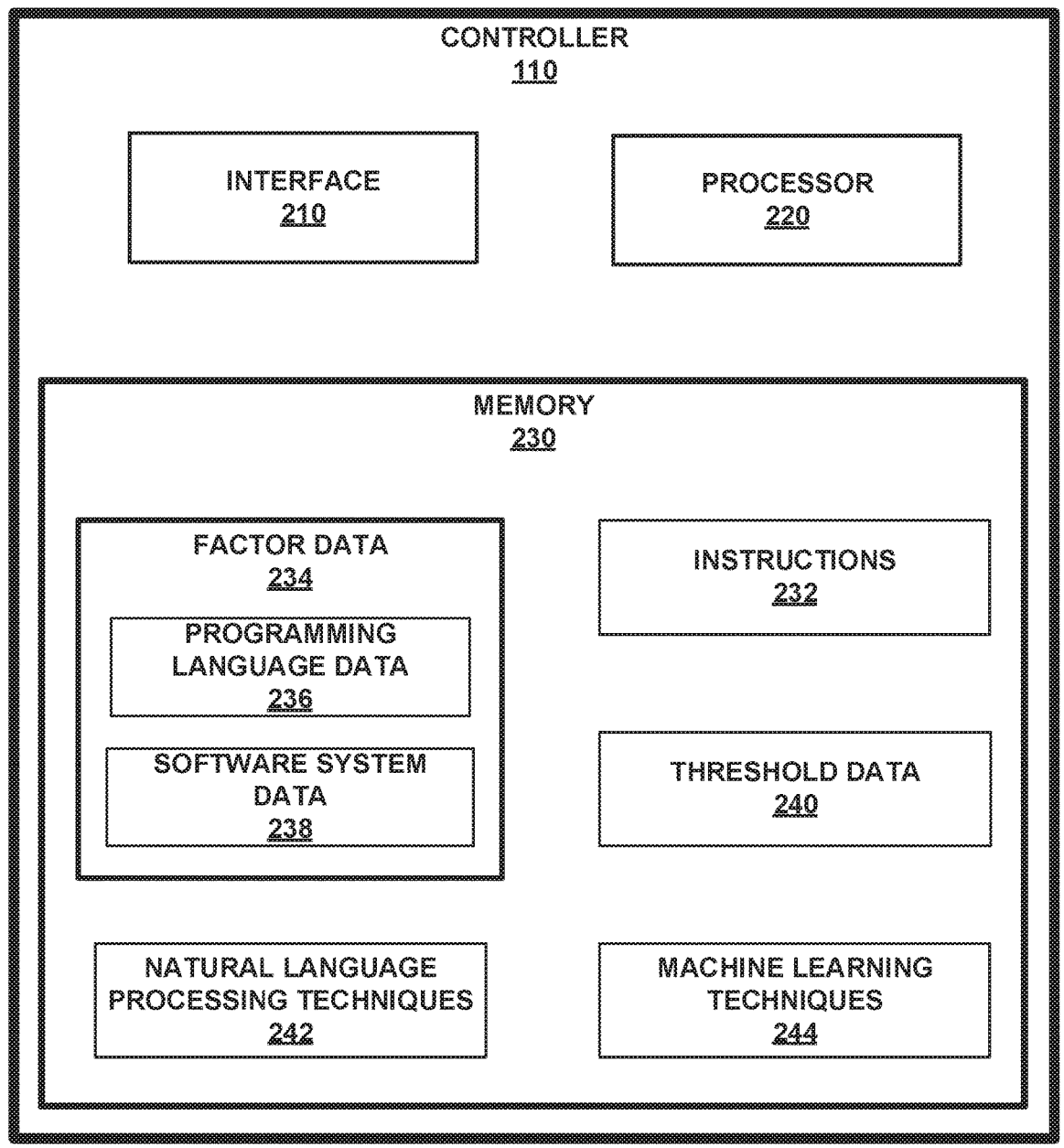
FIG. 2 depicts a conceptual box diagram of example components of the controller of FIG. 1.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user device 120, software system 130, repositories 140, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to convert commands coming from user devices 120 into code for software solution 130. Controller 110 may utilize processor 220 to thusly convert natural language commands into code. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to convert commands from a user into code that weigh factors of the programming languages and the software system.

Processor 220 may convert commands into code according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may convert commands into code as described herein according to instructions 232 of one or more applications (e.g., software applications) stored in memory 230 of controller 110.

In addition to instructions 232, in some examples gathered or predetermined data or techniques or the like as used by processor 220 to convert commands into code as described herein may be stored within memory 230. For example, memory 230 may include information described above that is gathered from software system 130 and/or programming language repositories 140. For example, as depicted in FIG. 2, memory 230 may include factor data 234. Factor data 234 may include all factors that are weighed by controller 110 in generating the output code. For example, factor data 234 may include any programming language(s) that are specified in the command, and/or any called functions that are specifically called out in the command. In some examples, factor data 234 may include the intent as determined by controller 110.

As depicted in FIG. 2, factor data 234 may include programming language data 236. Programming language data 236 may include strengths and/or weakness of one or more programming languages. Strengths and/or weaknesses may include types of tasks that given programming languages can execute with better/worse performance (e.g., can execute faster/slower, can execute with more/less processing power, can execute while needing less/more memory). Programming language data 236 may also include a list of functionality that is unique to any programming languages.

Factor data 234 may also include software system data 238. Software system data 238 may include what programming language(s) are currently used to code software system 130. In some examples, this data may be even more granular, specifying what programming language(s) are used for what functionality. For example, controller 110 may determine to generate code in a first programming language for a task of a command because software system data 238 reflects that the first programming language is used to generate that functionality 100% of the time (e.g., even though the first programming language is only used 20% of the time overall). Software system data 238 may also include data on what programming language(s) and/or functionality the general programming staff, the maintenance staff, or other departments are more or less comfortable with. For example, software system data 238 may include data on a competence level of the maintenance staff, where the competence level includes such data as an number of hours coding in a programming language, a number of staff that have professed or demonstrated competence in a programming language, scores from a publicly available software application that evaluates coding proficiency, degrees or certifications relating to programming languages, or the like.

Further, memory 230 may include threshold data 240. Threshold data 240 may include thresholds that define when to use certain types of programming languages and/or tasks. For example, threshold data 240 may specify to use a specified programming language of a command so long as both the specified programming language is used in at least a first predetermined threshold of software solution 130 (e.g., used at least 50% of the time) and there is no other programming language that performs more than a second predetermine threshold better (e.g., there is no other language that is at least 20% faster or more efficient).

Memory 230 may further include NLP techniques 242. NLP techniques 242 can include, but are not limited to, semantic similarity, syntactic analysis, and ontological matching. For example, in some embodiments, processor 220 may be configured to analyze a command as received from an operator to determine semantic features (e.g., word meanings, repeated words, keywords, etc.) and/or syntactic features (e.g., word structure, location of semantic features in headings, title, etc.) of this command. Ontological matching could be used to map semantic and/or syntactic features to a particular concept. The concept can then be used to determine the intent of the command, and/or tasks that are required to satisfy the command. In this same way, controller 110 may identify what the intent is of a command, and also identify what tasks are best suited to satisfy this command as described herein.

Memory 230 may further include machine learning techniques 244 that controller 110 may use to improve a process of converting commands to code as discussed herein over time. Machine learning techniques 244 can comprise algorithms or models that are generated by performing supervised, unsupervised, or semi-supervised training on a dataset, and subsequently applying the generated algorithm or model to convert commands into code. Using these machine learning techniques 244, controller 110 may improve an ability of converting commands into code over time. For example, controller 110 may determine that some types of generated code are accepted more frequently, and/or result in less bugs or patches. Controller 110 may reinforce rules that result in generated code that is accepted more frequently and result in less bugs or patches, and weaken rules that do the opposite, therein improving an ability of converting commands into code over time. Controller 110 may even learn different preferences of different operators, such as whether some operators typically accept anything that controller 110 provides, while other operators are more critical of controller 110 provided code when the code does not accord with elements of the command. Controller 110 may alter how code is generated for such operators over time.

In some examples, controller 110 may regularly supplement a knowledge corpus of the models that utilize machine learning techniques 244 to convert commands into code. For example, controller 110 may periodically crawl through one or more online programming language repositories 140 or the like to identify new or updated functionality of one or more programming languages. For example, controller 110 may mine a help and/or documentation corpus (e.g., a manual, frequently asked question section, or the like) from programming language repositories to determine how to execute "standard" coding functionality (e.g., how to iterate efficiently, how to handle references or pointers, how to perform input/output, how to perform error and exception handling). Controller 110 may further using natural language processing techniques 242 to map this functionality to various tasks and/or intents as discussed herein (e.g., looping a list, iterating file contents, exception handling, etc.). In some examples, controller 110 may crawl through various software webpages and comment boards or the like to determine preferred techniques, perceived and/or quantified strengths/weakness of programming languages, or the like.

Controller 110 may further improve the models that use machine learning techniques 244 by tracking a performance of eventual software solutions 130 over time. Controller 110 may track software solutions 130 and measure how different programming languages perform for different tasks, how quickly tickets are responded to for what programming languages (e.g., reflecting a competence level of the maintenance staff for the programming language of the root of the ticket), or the like.

Controller 110 may also use machine learning techniques 244 to improve at the act of determining what resource that should be acted upon for the command. In some examples, there may not be a physical resource to be acted upon, but rather a simple data structure (such as a variable, map, or list) or an actual resource (like a file, database, or object storage). In such examples, controller 110 may use machine learning techniques 244 to learn to use the identified intent to determine which resource is targeted using natural language processing techniques 242 descried above. Essentially, controller 110 may use machine learning techniques 244 to determine what entity is performing what action on what entity at what time(s), and may create tasks accordingly.

Machine learning techniques 244 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
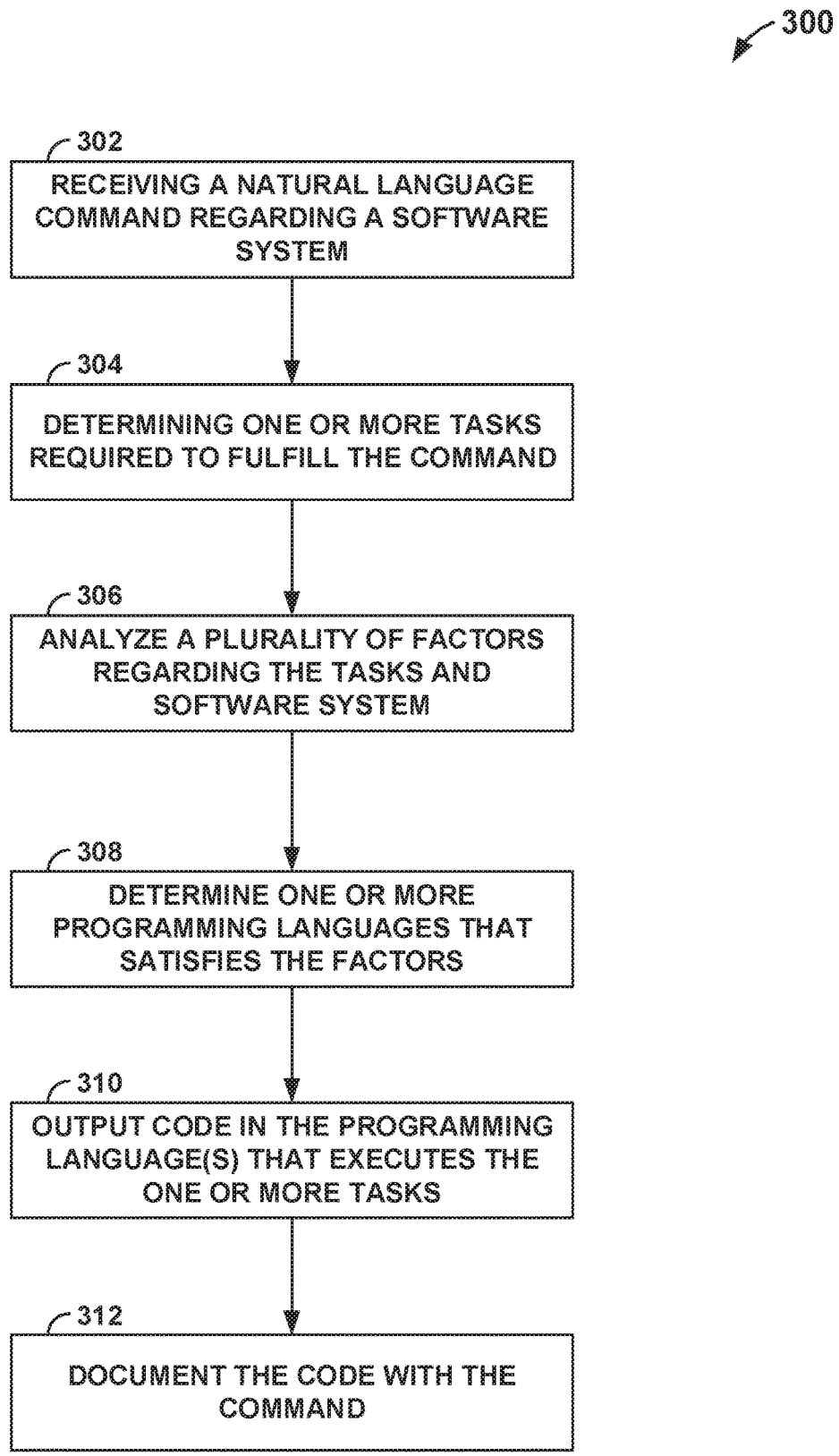
FIG. 3 depicts an example flowchart by which the controller of FIG. 1 may convert natural language commands into code for a software system.

Using these components, controller 110 may convert commands from operators into code by determining an intent of commands and weighing various factors as discussed herein. For example, controller 110 may convert commands into code according to flowchart 300 depicted in FIG. 3. Flowchart 300 of FIG. 3 is discussed with relation to FIG. 1 for purposes of illustration, though it is to be understood that other systems may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 may receive a natural language command regarding software system 130 (302). Controller 110 may receive this command over network 150 from user device 120. This command may have been a written command, a spoken command (e.g., that is then translated into text via speech-to-text techniques), or the like. The command may include a plurality of steps, a programming language, a task, or the like.

Controller 110 determines one or more tasks that are required to fulfill the command (304). These tasks are tasks that software system 130 is to execute (e.g., execute during operation by an end-use customer). Controller 110 may identify an intent of the command in order to determine the tasks. For example, controller 110 may utilize NLP techniques to determine what the operator intended the generated code to do in order to determine the intent, and upon determining the intent the controller 110 may separate this out into individual tasks that code can execute.

In some examples, these tasks may correlate with the command, such that a plurality of steps of the command match with a plurality of determined tasks. In other examples, controller 110 may determine that more or less tasks are required to fulfill the intent of the command. For example, the command may specify three specific steps, after which controller 110 determines that an intent of the command can be more efficiently satisfied with two tasks. For another example, the command may specify three specific steps which controller 110, and controller 110 may determine that an intent of the command is more robust and ten tasks are required to satisfy it. In some examples, controller 110 may identify tasks that generally align with a logical order of steps, whereas in other examples a logical order of tasks may be notably different (e.g., doing things in a different order, skipping some steps) than the logical order of the provided steps.

Controller 110 analyzes a plurality of factors that regard these identified tasks and software system 130 (306). These factors may regard an eventual performance of software system 130, such as a speed of software system 130, a stability of software system 130, a memory usage of software system 130, a processing usage of software system 130, or the like. These factors may also regard the maintainability of software system 130, such as what programming languages the majority of operators and/or support staff are familiar with.

Controller 110 determines one or more programming languages that satisfies the factors (308). Where controller 110 determines that the command related to a two-part task (e.g., such that two tasks are required to fulfill the command), controller 110 may determine that a first programming language best satisfies the factors for a first task of the command, while a second programming language best satisfies the factors for a second task, etc. As discussed herein, controller 110 may determine that programming language(s) satisfy various factors as a result of strengths, weaknesses, unique functionalities, or the like of the programming language(s) matching with the factors. For example, controller 110 may determine that two programming languages have strengths that align well with the tasks (and that both programming languages are used relatively frequently within software system 130), but that a maintenance staff has more people that have scored higher in one of the two programming languages (such that the maintenance staff has a higher competence level in this programming language), and therein determine to use this programming language in which the maintenance staff is more competent.

Controller 110 outputs code in the determined programming language(s) that executes the determined task(s) (310). Controller 110 may output the code such that the syntax is complete and ready for use. Controller 110 may output the code in any format. In some examples, controller 110 may output the code directly into a programming window of user device 120.

Controller 110 documents the code with the received command (312). Controller 110 may document the code by putting the command into the code as a remark. In some examples, controller 110 may change a tense or tone of the command to refer to a past statement rather than a current request.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a natural language command from an operator regarding a task that is a two-part task and that a software system is to execute;
   determining a first programming language in which to program a first half of the task by analyzing a plurality of factors regarding the task and the software system;
   determining a second programming language in which to program a second part of the two-part task by analyzing the plurality of factors; and
   outputting a first and second portion of the code in the first and second programming language that executes a first and second part of the two parts of the task, respectively.

2. The computer-implemented method of claim 1, wherein a factor of the plurality of factors includes a competence level of a maintenance staff for the software system regarding the first and second programming languages.

3. The computer-implemented method of claim 1, wherein the plurality of factors includes analyses on how strengths and weaknesses of the first and second programming languages align with the task.

4. The computer-implemented method of claim 1, wherein a factor of the plurality of factors is a predominant programming language of the software system.

5. The computer-implemented method of claim 1, further comprising adding the command to documentation of the software system.

6. The computer-implemented method of claim 1, further comprising determining that the command relates to the task by identifying an intent of the command, wherein a set of natural language words of the command do not reference the task.

7. The computer-implemented method of claim 1, wherein the command includes a plurality of discrete steps.

8. The computer-implemented method of claim 7, wherein the task is not aligned with the plurality of discrete steps.

9. A system comprising:
   a processor; and
   a memory in communication with the processor, the memory containing instructions that, when executed by the processor, cause the processor to:
      receive a natural language command from an operator regarding a task that is a two-part task and that a software system is to execute;
      determine a first programming language in which to program a first half of the task by analyzing a plurality of factors regarding the task and the software system;
      determine a second programming language in which to program a second part of the two-part task by analyzing the plurality of factors; and
      output a first and second portion of the code in the first and second programming language that executes a first and second part of the two parts of the task, respectively.

10. The system of claim 9, the plurality of factors includes:
    a competence level of a support staff for the software system regarding the first and second programming languages;
    analyses on how strengths and weaknesses of the first and second programming languages align with the task; and
    a predominant programming language of the software system.

11. The system of claim 9, the memory containing additional instructions that, when executed by the processor, cause the processor to add a version of the command to documentation of the software system.

12. The system of claim 9, the memory containing additional instructions that, when executed by the processor, cause the processor to determine that the command relates to the task by comparing an intent of the command with capabilities of the programming language, wherein a set of natural language words of the command do not reference the task.

13. The system of claim 9, wherein the command includes a plurality of discrete steps, and the task is not aligned with the plurality of discrete steps.

14. A computer program product, the computer program product comprising a computer readable storage medium having program instructions embodied therewith, the program instructions executable by a computer to cause the computer to:
- receive a natural language command from an operator regarding a task that is a two-part task and that a software system is to execute;
- determine a first programming language in which to program a first half of the task by analyzing a plurality of factors regarding the task and the software system;
- determine a second programming language in which to program a second part of the two-part task by analyzing the plurality of factors; and
- output a first and second portion of the code in the first and second programming language that executes a first and second part of the two parts of the task, respectively.

15. The computer program product of claim 14, wherein the plurality of factors includes:
- a competence level of a support staff for the software system regarding the first and second programming languages;
- analyses on how strengths and weaknesses of the first and second programming languages align with the task; and
- a predominant programming language of the software system.

16. The computer program product of claim 14, the computer readable storage medium containing additional program instructions that, when executed by the computer, cause the computer to add a version of the command to documentation of the software system.

17. The computer program product of claim 14, the computer readable storage medium containing additional program instructions that, when executed by the computer, cause the computer to determine that the command relates to the task by comparing an intent of the command with capabilities of the programming language, wherein a set of natural language words of the command do not reference the task.

* * * * *